G. W. Brown.
Corn Planter.
No. 1,095. Reissued Dec. 11, 1860.
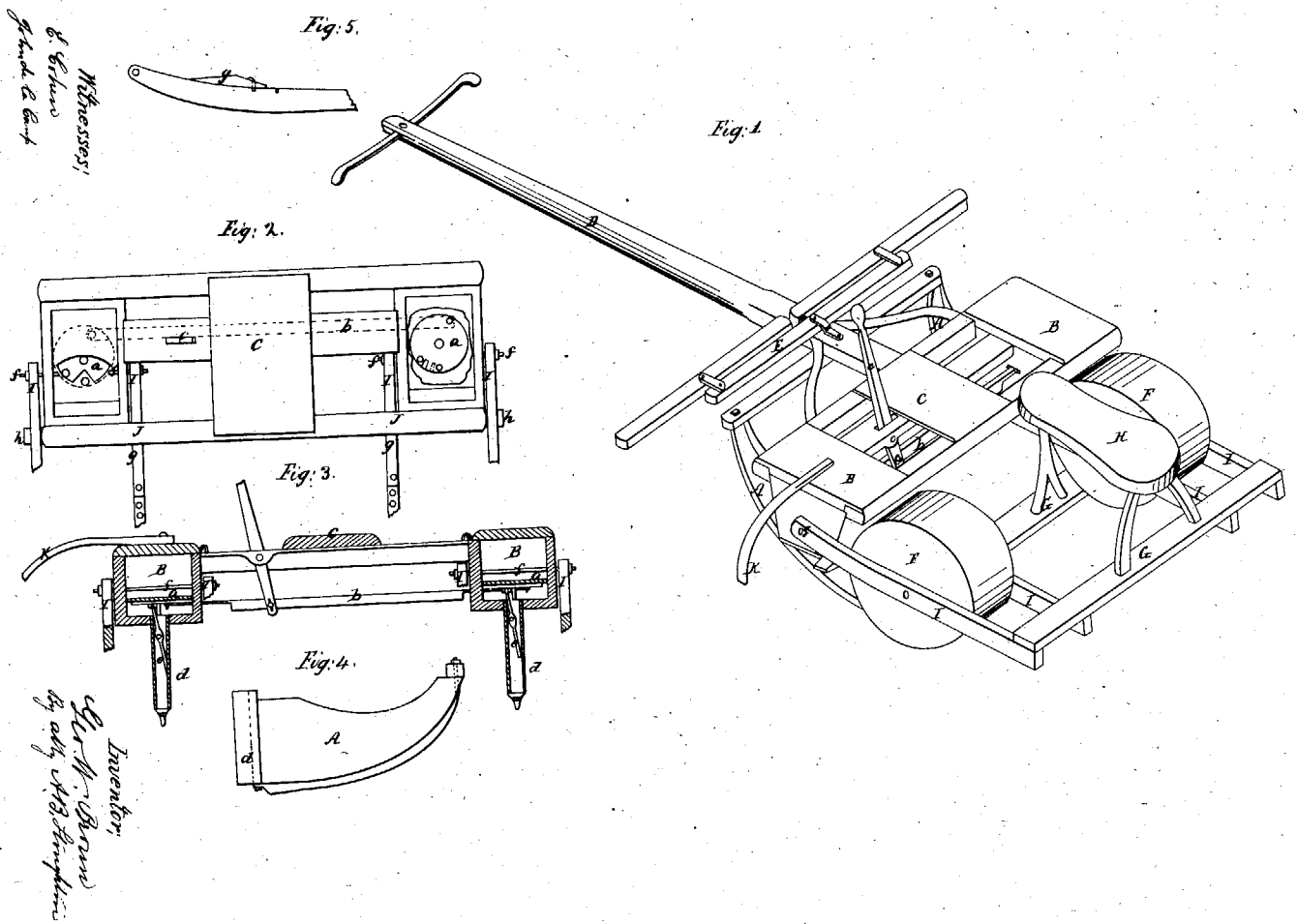
Witnesses;
E. Erhen
John de la Camp
Inventor;
Geo. W. Brown
By atty A. B. Stimpson

UNITED STATES PATENT OFFICE.

GEO. W. BROWN, OF GALESBURG, ILLINOIS.

IMPROVEMENT IN SEED-PLANTERS.

Specification forming part of Letters Patent No. 12,811, dated May 8, 1855; Reissue No. 503, dated November 10, 1857; Reissue No. 1,095, dated December 11, 1860.

DIVISION E.

*To all whom it may concern:*

Be it known that I, GEORGE W. BROWN, of Galesburg, in the county of Knox and State of Illinois, have invented certain new and useful Improvements in Seed-Planters; and I do hereby declare that the following is a full, clear, and exact description of the same, reference being had to the accompanying drawings, making a part of this specification, in which—

Figure 1 represents a perspective view of the machine complete. Fig. 2 represents a top plan of the seed-hoppers and valves and frame-work supporting them. Fig. 3 is a vertical transverse section through the seed-hoppers, valve, and runners or shoes, and showing a device for operating the valves, also representing parts of the frame for supporting them, as well as the marker. Fig. 4 represents a side elevation of one of the runners. Fig. 5 represents the lock or block for defining or adjusting the descent of the rear part of the frame.

Similar letters of reference, where they occur in the several figures, denote corresponding parts of the machine in all the drawings.

In a seed-planting machine operated by hand it is of course very desirable to relieve the operator of all the manual labor possible, inasmuch as his duties are of the most fatiguing character; and among the most arduous of his duties is that of operating the seed slides or valves, being obliged to extend his arm back and forth constantly and rapidly for days at a time. Where a single valve or slide is used it is easy enough to do the dropping, as every forward and every backward motion of the arm or foot opens and closes the valve both; but the difficulty with the single valve is this, that the grain, in dropping from the hopper to the bottom of the furrow, has so far to fall that the forward motion of the machine dribbles it along and makes irregular planting. To avoid this a valve has been placed down near the bottom or in the seed-tube, which catches the grain from the hopper and drops it from that low point into the furrow; but in the valves as heretofore used in the seed-tubes it required either two motions of the arm to open and close them—viz., one to open it and another to close it—so that two motions of the arm were required for every charge of grain dropped, or else the quantity of seed dropped from the hopper had no measured relation in time or quantity to that dropped from the tube.

The nature of my invention consists in so combining a lever with the slide or valve in the hopper, and with a valve in the seed-tube, as that they may be both opened and closed by a half-motion or single motion of the lever, operated by the attendant riding on the machine.

To enable others skilled in the art to make and use my invention, I will proceed to describe the same with reference to the drawings.

B B represent a pair of hoppers for containing the seed to be planted.

*a a* are the valves in said hoppers, these valves opening and closing the exit into the seed-tubes at every single motion of the lever *c*, to which they are connected by the bar *b*.

In the seeding-tubes *d d* are hung valves *e e*, which vibrate on a center, and they are connected to the bar or rod *b*, which is operated by the lever *c*, so that a single motion or half-motion of said lever not only opens but also closes the seed-tube. Assume the valves to be in the positions shown in Fig. 3. Now move the lever *c* to the right of said figure, and this single operation opens the valves to let the charge of grain previously caught and retained by them drop to the furrow, and at the same time instant closes it against the opposite side to catch the next charge, so that a half-motion of the lever both opens and closes the valves; and this saves the operator just one-half of his labor, which is a very material saving in a day's labor. If the valve or slide in the seed-tube required two motions to open and close it, then the valve in the hoppers would also require two motions, else the latter would furnish more grain to the former than would be a proper charge for each hill. I do not of course lay any claim to the opening and closing of a pair of valves by a double or two motions. It is to avoid this double labor that my invention aims at, and its importance will be duly appreciated when it is considered that one-half of the labor of the attendant is saved by my invention.

Having thus fully described my invention, what I claim under this patent is—

So combining with a lever, by which both may be operated, a valve or slide in the seed-hopper and a valve in the seed-tube as that a half-motion of the lever by the operator riding on the machine, by which they are operated, shall both open and close the seed-passages at regular periods and pass measured quantities only, substantially as described.

GEO. W. BROWN.

Witnesses:

A. B. STOUGHTON,

E. COHEN.